Figure 3:
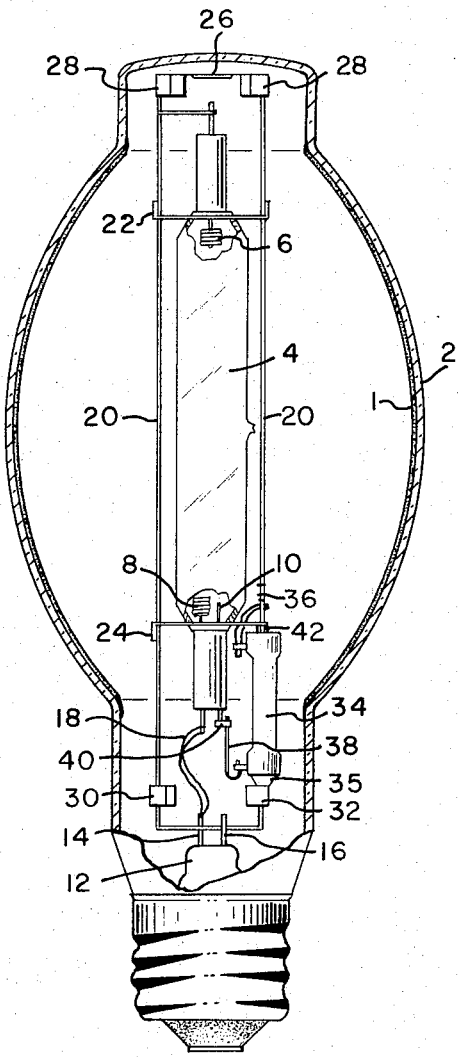

Dec. 26, 1967  F. F. MIKUS ET AL  3,360,675
EUROPIUM AND CALCIUM OR MANGANESE ACTIVATED
YTTRIUM VANADATE PHOSPHOR
Filed Nov. 23, 1964  2 Sheets-Sheet 1
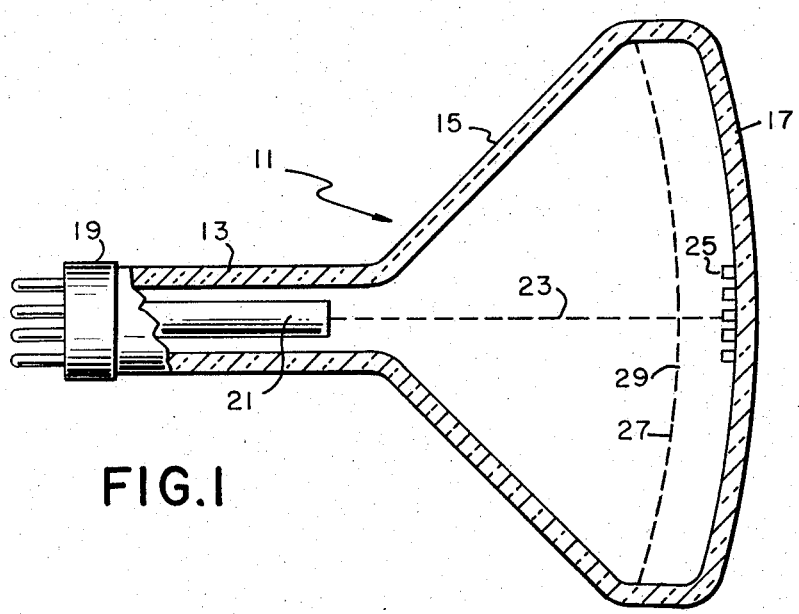
FIG.1
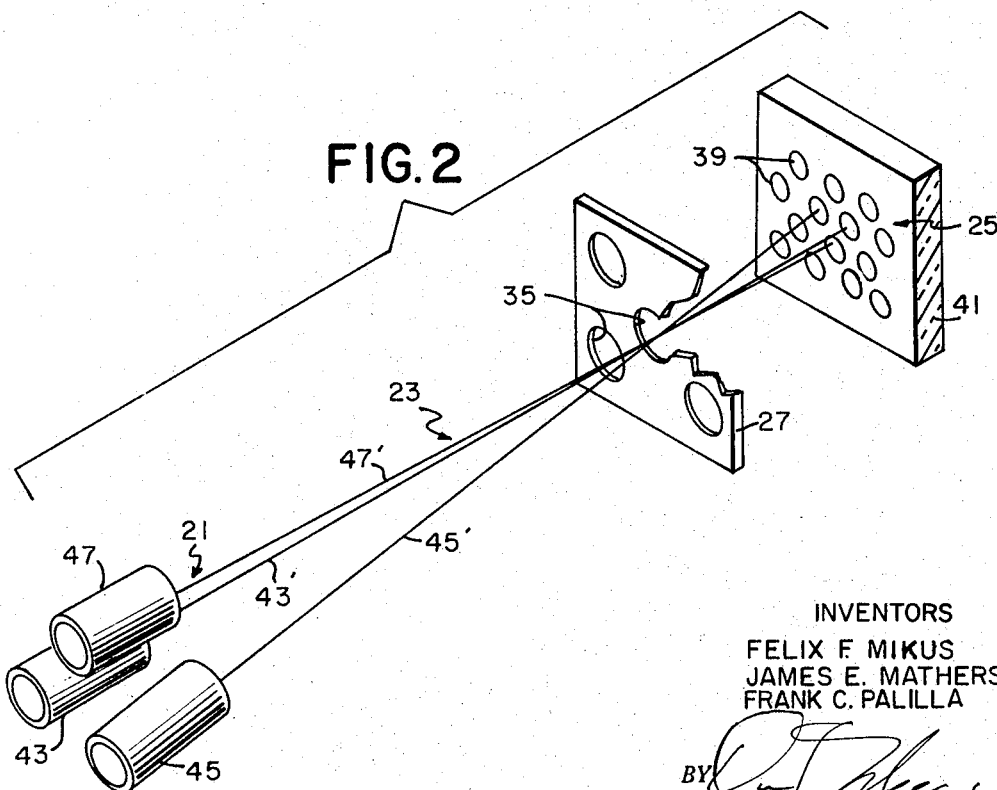
FIG.2
INVENTORS
FELIX F. MIKUS
JAMES E. MATHERS
FRANK C. PALILLA
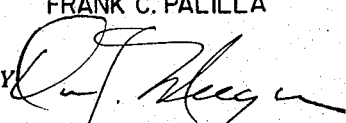
BY
ATTORNEY

3,360,675
EUROPIUM AND CALCIUM OR MANGANESE ACTIVATED YTTRIUM VANADATE PHOSPHOR
Felix F. Mikus, Towanda, and James E. Mathers and Frank C. Palilla, Ulster, Pa., assignors to Sylvania Electric Products Inc., a corporation of Delaware
Filed Nov. 23, 1964, Ser. No. 412,896
6 Claims. (Cl. 313—109)

This invention relates to the improvement of phosphor which can be excited by ultraviolet radiation, cathode rays and the like. Particularly, this invention relates to the improvement of red-emitting europium-activated, yttrium vanadate phosphors by the addition of calcium and/or manganese to the matrix.

One application of the phosphor of this invention is in color cathode ray tubes, especially those adapted to color television applications. These tubes usually employ at least one electron gun and a related viewing panel having a cathode-luminescent screen responsive to electron impingement disposed upon a surface thereof. Such a screen generally includes a plurality of discrete phosphor patterns consisting of elements such as bars, strips, or dots in groups of three, each element in response to electron beam excitation, emitting light of one of the primary colors, red, green and blue.

A screen of this type may be fabricated by a conventional photographic printing technique wherein a photosensitive material is utilized to bind the color-emitting phosphors to the viewing panel. In such a process, the viewing panel is first coated with a thin film of a photosensitive substance such as sensitized polyvinyl alcohol and a specific color-emitting phosphor. One method of coating is to first deposit a film of the photosensitive substance on the panel and then dispose a phosphor powder thereupon as by the well-known dusting procedure. Another method is applying a suspension of phosphor in the photosensitive substance as in the conventional slurry technique. The coated panel is then exposed to light substantially in the ultraviolet range through an appropriately patterned negative or aperture mask to cause the photosensitive substance to polymerize or harden and adhere to the surface of the panel in accordance with the patterned negative exposure, thus binding the respective phosphor particles therewith. Those portions of the screen which are not exposed to light are subsequently removed by dissolving the substance with a suitable solvent. This procedure is repeated for the deposition of each color-emitting phosphor pattern of the screen; the sequential order of color deposition not being critical. A subsequent bakeout eliminates the volatile ingredients leaving the phosphor-patterned screen as a completed unit of the tube structure.

For usage in a compatible cathodoluminescent screen combination, the particular color phosphor materials are selected with reference to certain aspects of color characteristics, such as hue, degree of saturation, and brightness. In a color cathode ray tube as employed in a television receiver, it is desirable to have a cathodoluminescent phosphor screen combination that will produce a balanced white color upon simultaneous beam bombardment of the several phosphors contained therein. The cathodoluminescent white, as produced in a color cathode ray tube, is the result of the combined luminous emission of all of the phosphors on the screen in accordance with a predetermined relationship of their various respective luminous characteristics.

In an endeavor to achieve the desired luminescent relationship, various color-emitting phosphor materials, selected for their contributing and compatible color qualities, are suitably disposed as patterned groups in a common screen.

Unfortunately, several of the acceptable phosphors which may be compatibly associated to produce a cathodoluminescent white when taking hue and saturation into consideration, have unequal brightness efficiencies due to their chemical compositions. This sometimes necessitates an intentional adjustment or reduction in the luminescence of the associated brighter phosphors to more nearly approximate the brightness of the less efficient phosphors of the screen combination. Such a compromising procedure can reduce the level of overall screen brightness. Further, adjustment of the imbalance of phosphor brightness performance is accomplished by regulating the intensities of the respective impinging electron beams to provide the proper degree of brightness from each phosphor in the adjusted combination. Thus, the less efficient color-emitting phosphors require electron beam currents of significantly higher values than those necessary for exciting the brighter phosphor components of the screen combination.

Inherent body color is considered an important characteristic of phosphors and relates to the degree of translucency or opacity of the particular crystal. The phosphors which are substantially translucent are conventionally classed as having a desirable white body color and they enhance the transmission of light therethrough during screen fabrication and subsequent tube operation.

There are a number of cathodoluminescent phosphors that appreciably luminesce or emit upon electron bombardment in the green and blue regions of the spectrum, but those emitting strongly in the red region are fewer in number. For example, a conventional color television picture tube may employ a discretely patterned screen of color emitting phosphors in the form of silver-activated sulfidehost compounds, such as blue-emitting zinc sulfide, green-emitting zinc-cadmium sulfide, and red-emitting zinc-cadmium sulfide. The red-emitting phosphor, because of an extremely high cadmium content, has an objectionable yellow-orange body color.

Another shortcoming of the red-emitting zinc-cadmium sulfide phosphor is its low luminous efficiency relative to the green-emitting zinc-cadmium sulfide and the blue-emitting zinc sulfide phosphor. This makes the presently used zinc-cadminum red-emitting phosphor the limiting factor in developing a color screen combination of high brightness. Therefore, in the conventional approach to provide a screen color combination of balanced brightness, it has been found necessary, in certain instances, to reduce the inherent brightness levels of the green-emitting zinc-cadmium sulfide and the blue-emitting zinc sulfide phosphor in the system by either milling the phosphors, introducing small amounts of luminescent quenchers into the respective green-emitting and blue-emitting phosphor crystals or by the manipulation of synthesis temperatures during crystal formation.

Another objectional characteristic of the silver activated zinc-cadmium sulfide, red-emitting phosphor relates to the undesirable yellow-orange body color of the crystal. When incorporated in a screen it imparts a noticeable yellowish off-white appearance to the screen as a whole. Furthermore, during tube operation in a lighted room, this off-white characteristic alters the correct color rendition of the image being viewed because of the selective and non-uniform reflectivity of the phosphor to white light.

There are additional shortcomings to the presently used zinc-cadmium red-emitting phosphor component. One is evidenced in the fabrication of the color screen by the previously described photographic printing technique, whereby the yellow-orange body color of the red-emitting zinc-cadmium sulfide phosphor absorbs a considerable portion of the ultraviolet radiation used for polymerizing the photosensitive polyvinyl alcohol during the red phosphor exposure step. This necessitates an undesirably prolonged period of exposure which not only aggravates the possibilities of screen contamination due to the scattering of light to adjacent phosphor areas, but also retards the manufacturing process. Another deterrent is that the hue of the red-emitting sulfide phosphor is frequently found to shift in the temperature range encountered during tube processing. Moreover, during tube operation it is well known that the red-emitting sulfide phosphor manifest an objectionable color shift when the brightness level of the image changes from lower to higher brightness values.

Another application of the phosphor is in high pressure mercury vapor lamps (HPMV) which are good emitters of blue, green and yellow light but are poor emitters of red light. Consequently, unless corrected for this deficiency, they distort the true color of many objects and are not suitable for applications in which good color rendition is necessary. HPMV lamps are also excellent emitters of ultraviolet radiation and therefore a number of phosphors have been developed which take advantage of this characteristic by emitting red light in response to excitation by ultraviolet radiation. These color-correcting phosphors are generally placed on the inner surface of a transparent envelope surrounding the arc tube discharge source.

To be suitable for use as a color corrector of this type, the phosphor should respond efficiently to excitation by the ultraviolet component of the mercury vapor emission. This component is principally in the range between 2300 and 3800 A. and is especially intense at 3130 and 3660 A. The phosphor must also maintain high efficiency at the operating temperature of the lamp envelope (150° C. to 350° C.) and should not decrease significantly in efficiency after several thousand hours of operation. In addition, attenuation of the visible light emitted by the mercury arc should be as low as possible.

One phosphor material which has been used as a color corrector in HPMV lamps is magnesium fluorogermanate activated by tetravalent manganese. This phosphor emits a deep red color when excited by ultraviolet radiation but significantly attenuates the visible light emitted by the discharge. More specifically, the fluorogermanate phosphor introduces new bands of radiation in the red region but the peak of this radiation occurs at 6620 A. where the sensitivity of the eye is very low. The added emission in the red region is not sufficient to compensate for the attenuation of the shorter visible wavelengths of the mercury emission at 5460 and 4360 A. and consequently, the efficiency measured in lumens of light output per watt of input power is lower for the fluorogermanate coated lamp than for the uncoated lamp.

Another material which has been used for color correction is tin-activated calcium or strontium zinc phosphate. This phosphor presents the advantage that the red components added to the mercury arc emission above 5900 A. together with its broad spectrum of emission below this wavelength is large enough to offset the attenuation of the shorter wavelength mercury lines at 5460 and 4360 A. thereby resulting in an overall increase in efficiency as compared to an uncoated lamp. However, the ratio of the lumens of red light above 5900 A. emitted by a lamp employing calcium zinc phosphate as a color corrector to the total lumens output of the lamp is considerably less than is obtained with the fluorogermanate phosphor, that is the proportion of total light to red light is considerably smaller.

In a copending application by Levine et al. Ser. No. 334,565 filed Dec. 30, 1963, certain new phosphors are disclosed which produce an excellent red emission. We have now found that the luminescent efficiency of the europium-activated, yttrium vanadate phosphor described can be improved through the addition of calcium and/or manganese to the matrix.

Accordingly, the primary object of our invention is the improvement of europium-activated yttrium vanadate phosphors.

A further object of this invention is the incorporation of calcium and/or manganese in europium-activated yttrium vanadate phosphors to improve luminous efficiency of the basic phosphor when it used as a coating on the envelopes of electric discharge devices and on the screens of cathode ray tubes.

The many other objects, features and advantages of this invention will become manifest to those conversant with the art upon reading the following specification when taken in conjunction with the accompanying drawings in which preferred embodiments of our invention are shown and described by way of illustrative examples.

The phosphor of our invention can be disposed upon the screen of a cathode ray tube such as shown in FIGURE 1 and commonly in use in television receiving apparatus. The tube comprises an envelope 11 having a neck portion 13, a funnel portion 15, and a face panel 17. A tube base 19 is attached to the neck portion 13 to provide means for connecting the tube electrodes with their associated receiver circuitry. Within the neck 13 there is mounted an electron gun or guns 21 which provide the electron beam or beams 23 utilized in the operation of the tube. A color screen 25 having the usual configurations of color-emitting phosphors is formed on the internal surface of face panel 17. Positioned adjacent to screen 25, but substantially spaced therefrom, is a mask or grid 27 having therein a plurality of apertures 29. The type of tube illustrated in FIGURE 1 may use grid 27 primarily to either focus or deflect beam 23, or to mask, or to mask and focus the electron beam to attain proper electron impingement upon the color screen 25. The specific grid and screen structures and the potentials on the grid and screen will determine the type of operation in a manner well understood in the art.

In greater detail, there is shown in FIGURE 2 one specific form of a screen and grid structure having internal portions of a tri-gun shadow mask tube employing a pattern of tri-color phosphor groups in the form of red, green, and blue color-emitting phosphor dots discretely arranged on the screen 25. The electron guns or electron beam emitters 21 are spaced equidistantly from one another and are usually triadmounted to provide static convergence of the respective electron beams at the central mask or grid opening. As a specific example, these electron guns 21 individually emit a beam of electrons 23, all of which converge at an aperture 35 in masks 27, and cross one another to impinge upon the associated color-emitting phosphor dots 39 formed on viewing panel 41. The three electron guns 43, 45 and 47 are oriented to provide electron beams 43', 45' and 47' to the red, green and blue color-emitting phosphor dots respectively.

A compatible green-emitting phosphor, which may be included as a color component in a cathodoluminescent screen, along with the aforementioned red-emitting, europium activated, yttrium vanadate phosphor containing calcium and/or manganese is zinc-cadmium sulfide, which may be self-activated with zinc or activated with silver. This phosphor has a substantially white body color with a very slight yellowish tinge and the ratio by weight of the zinc sulfide to the cadmium sulfide is substantially within the range of 1.5:1 to 2:1.

Another green phosphor, such as manganese activated zinc silicate may be used on the screen in combination with the aforementioned calcium and/or manganese containing vanadate. This phosphor has a medium persistence green and is adequate for a particular usage requirement. The manganese activator may be in an amount ranging substantially from 0.08 to 1.5 mole percent.

A compatible blue-emitting phosphor which can be used with the aforementioned green-emitting phosphors is zinc sulfide. The latter may be self-activated or activated with silver. This phosphor has white body color. When silver activated, the amount of silver which can be included in the host can range up to .050 mole percent.

These three specific color-emitting phosphors are individually disposed in a screen by the aforementioned photographic printing-dusting techniques. Details of this dusting or dry-powder method are described in U.S. Patent 3,025,161 granted to Thaddeus V. Rychlewski and entitled "Method of Forming Patterns." Briefly, a coating of photosensitized polyvinyl alcohol is applied to the panel upon which a layer of dry phosphor powder is dusted. This is suitably exposed and developed. The component color phosphors are subsequently offset and disposed in a similar manner to form a complete screen pattern. For the dry powder method of phosphor deposition, it is desired that the particle size of each of the color phosphors be substantially within the range of 2.0 to 20.0 microns as measured by a Fischer Sub-Sieve Sizer.

The screen may also be fabricated by disposing the phosphors in wet form as by the conventional slurry technique wherein each color phosphor is suspended in a separate photosensitized polyvinyl alcohol solution which is applied, exposed and developed as a separate pattern layer. The screen is completed by disposing the remaining color phosphors in similar fashion. When utilizing the slurry technique for phosphor deposition, it has been found that a particle size ranging from 0.5 to 7.0 microns is satisfactory.

Now we have stated our invention involves adding calcium and/or manganese to europium-activated yttrium vanadate phosphor. The calcium and/or manganese must be added in certain specific properties to achieve the beneficial results of our invention. In particular, the $YVO_4$:Eu phosphor can have between 0.001 to 0.1 mole of europium per mole of vanadate anion. The calcium and/or manganese should be added in quantities between about $1 \times 10^{-5}$ to $5 \times 10^{-3}$ gram atoms per mole of vanadate anion. Above and below this range, the improvement in brightness is not evidenced. In the case of the manganese addition, there is a darkening of the body color.

The particular effect is shown in Table I following. The quantities of calcium and/or manganese added are compared to an arbitrary standard of yttrium vanadate activated by europium. The results are given in cathode ray brightness and the color coordinates.

TABLE I

| Sample No. | Grm. Atom Ca/Mole Vanadate | Grm. Atom Mn/Mole Vanadate | CR Brightness Calcium vs. Control | CR Brightness Manganese vs. Control |
|---|---|---|---|---|
| A (Control) | 0 | 0 | 100 | 100 |
| B | $1.8 \times 10^{-4}$ | $3.46 \times 10^{-5}$ | 107 | 100 |
| C | $3.6 \times 10^{-4}$ | $8.65 \times 10^{-5}$ | 107 | 100 |
| D | $7.2 \times 10^{-4}$ | $17.3 \times 10^{-5}$ | 107 | 101 |
| E | $11 \times 10^{-4}$ | $34.6 \times 10^{-5}$ | 111 | 102 |
| F | $14.7 \times 10^{-4}$ | $51.9 \times 10^{-5}$ | 107 | 106 |
| G | $18.3 \times 10^{-4}$ | $69.2 \times 10^{-5}$ | 111 | 100 |
| H | $22 \times 10^{-4}$ | $86.5 \times 10^{-5}$ | 114 | 99 |
| I | $25.7 \times 10^{-4}$ | $104 \times 10^{-5}$ | 113 | 98 |
| J | $29.3 \times 10^{-4}$ | $121 \times 10^{-5}$ | 112 | 98 |
| K | $33 \times 10^{-4}$ | $138 \times 10^{-5}$ | 107 | 96 |
| L | $36 \times 10^{-4}$ | $173 \times 10^{-5}$ | 107 | 91 |

With regard to the addition of calcium, the trivalent ion appears to enhance the efficiency of $YVO_4$:Eu through charge compensation in two ways. $Eu^{+3}$ is an efficient activator in the yttrium vanadate system while $Eu^{+2}$ is not. If the equilibrium $Eu^{+2} \rightleftharpoons Eu^{+3}$ is shifted to the right, it will tend to increase the efficiency of the ion in its role as an activator. The replacement of $Y^{+3}$ by $Ca^{+2}$ in the zircon structure of $YVO_4$ results in a deficiency of positive charge which, in order to preserve electrical neutrality, must be compensated for by either a decrease of one negative charge in the anion portion or by the increase of one positive charge of one of the cations. Such compensation can be accomplished by $Eu^{+2}$ going to $Eu^{+3}$.

An ion will replace another in a crystal without distortion of the lattice if the ionic radii are within 10 to 12% of each other. The crystal ionic radius of $Y^{+3}$ is about 0.93 A. and that of $Ca^{+2}$ is about 0.99 A. Hence calcium can easily displace yttrium. Moreover, the presence of $Ca^{+2}$ in the vicinity of quadrivalent ions such as $Ce^{+4}$, which occurs as an impurity in the yttrium vanadate matrix and adversely absorbs energy, decreases the harmful effect. Calcium tends to neutralize the strong, positive charge field produced by cerium. The energy of the cathode rays is absorbed by the host crystal from whence it migrates to the europium activation centers by the movement of electrons, holes and excited states. This migration of energy can be stopped by the strong field of quadrivalent impurity ions provided it is not neutralized. $Ca^{+2}$ in the crystal tends to push the europium into the trivalent oxidation state in which form it is an efficient activator. It also neutralizes the harmful effects of any quadrivalent ions which would hinder the migration of energy from the host crystal to the activation centers.

When manganese is added to the europium activated yttrium vanadate matrix, it acts as a charge compensator in a manner similar to the calcium as described above. Particularly, the manganous ion, such as would occur when the manganese is added as manganous carbonate acts as a charge compensator. When the manganese is added as a manganic ion or the permanganate, these act as oxidizing agents to oxidize europium to its higher valence state.

In FIGURE 3, the lamp shown comprises a fluorescent coating 1 on the outer jacket or envelope 2 of light-transmitting material within which an arc tube 4 is supported. The arc tube 4 is provided with main electrodes 6 and 8 at the ends thereof an auxiliary electrode 10 disposed adjacent to the main electrode 8. The tube is also provided with a filling of mercury and an inert gas.

The stem press 13 of the outer envelope 2 is provided with a pair of lead-wires 14 and 16, through which the arc tube 4 may be connected to a source of electrical energy. Lead-wire 14 is connected to electrode 8 of the arc tube 4 by a metal ribbon 18. A substantially U-shaped wire 20 is mounted on lead-wire 16. Collars 22 and 24, which encircle the arc tube 4 adjacent to the constricted ends thereof, are fixedly attached to the legs of the U-shaped wire 20 and thus support the arc tube within the outer envelope 2. A plate 26 bridges the free ends of the U-shaped support wire 20 and is fixedly attached thereto to impart rigidity to the structure. The free ends of the U-shaped support wire 20 are also provided with a pair of resilient metal fingers 28 which are fixedly attached thereto, the ends of the fingers 28 frictionally engaging the inner wall of the constricted upper end of the envelope 2 to further support the structure. Similarly, the lower portion of the legs of the U-shaped support wire 20 is provided with resilient metal fingers 30 and 32 which are fixedly attached thereto, the ends of the fingers 30 and 32 frictionally engaging the inner wall of the constricted lower end of the envelope 2.

Inside the lower end, a resistor 34 is disposed on wire 20 and is seated on an insulator button 35 which, in turn, rests on the upper longitudinal edge of resilient metal finger 32. Lead-wire 36 of resistor 34 is wound around support wire 20 and it is also welded thereto. This mode of connection has been found to be particularly advantageous, even if a weld failure should occur, the tight winding of lead-wire 36 about support wire 20 has been found to be adequate enough to maintain the electrical circuit through these members. Lead wire 38 of resistor 34 is welded to a metal ribbon 40 which is in turn connected to auxiliary electrode 10 of the arc tube 4.

Although considerable rigidity is imparted to the structure by positioning the resistor 34 on support wire 20 and winding lead-wire 36 of resistor 34 about support wire 20 and welding it thereto, additional structural rigidity may be obtained by positioning the resistor 34 on the support wire 20 so that the lower end thereof is seated on insulator button 35 and the upper end thereof is engaged by a depending flange 42 of collar 24. Another advantage which accrues from the use of insulator button 35 is the elimination of arcing, since the button 35 prevents contact between the body of the resistor 34 and support wire 20; this displacement prevents electrolysis of an ultimate arcing through of the resistor core.

The fluorescent coating of yttrium vanadate activated by europium and containing calcium and/or magnesium is disposed on the inside surface of bulb 2 and can be deposited by various methods known in the art such as flush coating or spraying.

Upon testing the phosphor at various concentrations of calcium and/or manganese, the following results of Table II were obtained. The excitation was at four points which are the principal lines of mercury emission; 2537, 3100, 3230 and 3650 A. The results are relative and are compared to an yttrium vanadate standard without any addition. For further comparison, a magnesium fluorogermanate phosphor is shown; a commercially utilized phosphor in high pressure electric discharge devices.

yttrium vanadate activated by europium and containing sufficient quantities of a cation selected from the group consisting of calcium and manganese in the matrix to enhance the luminescence of said yttrium vanadate.

2. A luminescent material consisting essentially of yttrium vanadate activated by europium and containing between about $1 \times 10^{-5}$ to $5 \times 10^{-3}$ gram atoms of a cation selected from the group consisting of calcium and manganese in the matrix.

3. A color cathode ray tube having at least one electron gun from which electrons are beamed to a cathodoluminescent screen applied to a screen supporting surface, said screen comprising: a plurality of phosphors disposed on said surface in discretely patterned groups, at least one of said phosphors being a red-emitting material consisting essentially of yttrium vanadate activated by europium and containing sufficient quantities of a cation selected from the group consisting of calcium and manganese in

TABLE II

| Sample No. | Gm. Atoms Ca/Mole Vanadate | Gm. Atoms Mn/Mole Vanadate | Brightness at Various UV Excitation for Calcium | | | | Percent Brightness at Various UV Excitation for Manganese | | | |
|---|---|---|---|---|---|---|---|---|---|---|
| | | | 2,537 A. | 3,100 A. | 3,230 A. | 3,650 A. | 2,537 A. | 3,100 A. | 3,230 A. | 3,650 A. |
| Std | 0 | 0 | 100 | 100 | 100 | 100 | 100 | 100 | 100 | 100 |
| A (Control) | 0 | 0 | 100 | 100 | 100 | 100 | 104 | 101 | 101 | 96 |
| B | $1.8 \times 10^{-4}$ | $3.46 \times 10^{-5}$ | 97 | 99 | 99 | 98 | 104 | 105 | 107 | 105 |
| C | $3.6 \times 10^{-4}$ | $8.65 \times 10^{-5}$ | 99 | 96 | 96 | 97 | 103 | 103 | 104 | 105 |
| D | $7.2 \times 10^{-4}$ | $17.3 \times 10^{-5}$ | 101 | 99 | 99 | 103 | 109 | 107 | 109 | 98 |
| E | $11 \times 10^{-4}$ | $34.6 \times 10^{-5}$ | 98 | 99 | 100 | 102 | 92 | 95 | 95 | 83 |
| F | $14.7 \times 10^{-4}$ | $51.9 \times 10^{-5}$ | 97 | 99 | 99 | 101 | 83 | 86 | 87 | 70 |
| G | $18.3 \times 10^{-4}$ | $69.2 \times 10^{-5}$ | 96 | 98 | 97 | 103 | 84 | 86 | 87 | 67 |
| H | $22 \times 10^{-4}$ | $86.5 \times 10^{-5}$ | 103 | 102 | 101 | 107 | 84 | 85 | 87 | 66 |
| I | $25.7 \times 10^{-4}$ | $10 \times 10^{-5}$ | 92 | 95 | 95 | 101 | 82 | 83 | 83 | 62 |
| J | $29.3 \times 10^{-4}$ | $121 \times 10^{-5}$ | 97 | 100 | 99 | 101 | 81 | 82 | 82 | 59 |
| K | $33 \times 10^{-4}$ | $138 \times 10^{-5}$ | 74 | 95 | 95 | 98 | 80 | 81 | 80 | 56 |
| L | $36 \times 10^{-4}$ | $173 \times 10^{-5}$ | 97 | 100 | 100 | 101 | 68 | 72 | 71 | 49 |
| Magnesium fluorogermanate | | | 34 | 28 | 17 | 210 | 55 | 37 | 38 | 238 |

As an example of preparing the phosphor of our invention we cite the following. The calcium and/or manganese can be of a convenient source such as the oxide, oxalate or carbonate.

| Material: | Grams |
|---|---|
| $Y_2(C_2O_4)_3$ | 2713.5 |
| $Eu_2(C_2O_4)_3$ | 169.4 |
| $NH_4VO_3$ | 2810.0 |
| $CaCO_3$ | 3.6 |

The materials are blended in the usual manner such a rolling, tumbling or milling. After blending, the raw materials are placed into shallow silica dishes and then placed into a furnace which is at room temperature. The temperature is brought up to 950° C. during the course of two hours and kept at that temperature for another two hours. Afterward, the dishes are removed from the furnace, cooled in air and the phosphor digested in a strong sodium hydroxide solution for half an hour. The phosphor is washed in water until a neutral pH is obtained. Following the wash, water is removed and the powder dried at 120° C. Afterward the phosphor can be disposed upon the face of a cathode ray tube or coated upon a lamp envelope as described previously.

| Material: | Grams |
|---|---|
| $Y_2(C_2O_4)_3$ | 2713.5 |
| $Eu_2(C_2O_4)_3$ | 169.4 |
| $NH_4VO_3$ | 2810.0 |
| $MnCO_3$ | 3.0 |

The materials are blended, fired and washed as described above and can be used similarly.

It is apparent that modification and changes may be made within the spirit and scope of the instant invention, but it is my intention, however, only to be limited by the scope of the appended claims.

As our invention we claim:

1. A luminescent material consisting essentially of the matrix to enhance the luminescence of said yttrium vanadate.

4. A color cathode ray tube having at least one electron gun from which electrons are beamed to a cathodoluminescent screen applied to a screen supporting surface, said screen comprising: a plurality of phosphors disposed on said surface in discretely patterned groups, at least one of said phosphors being a red-emitting material consisting essentially of yttrium vanadate activated by europium and containing between about $1 \times 10^{-5}$ to $5 \times 10^{-3}$ gram atoms of calcium and/or manganese in the matrix per mole of yttrium vanadate.

5. A high pressure mercury lamp comprising: an inner arc tube, an enclosing light transmitting outer jacket, a coating of phosphor on said jacket, said phosphor consisting essentially of yttrium vanadate activated by europium and containing sufficient quantities of calcium and/or manganese in the matrix to enhance the luminescence of said yttrium vanadate.

6. A high pressure mercury lamp comprising: an inner arc tube, an enclosing light transmitting outer jacket, a coating of phosphor on said jacket, said phosphor consisting essentially of yttrium vanadate activated by europium and containing between about $1 \times 10^{-5}$ to $5 \times 10^{-3}$ gram atoms of calcium and/or manganese in the matrix per mole of yttrium vanadate.

References Cited

UNITED STATES PATENTS

| 2,743,238 | 4/1956 | Hunt et al. | 252—301.6 |
| 3,110,680 | 11/1963 | Koelmans et al. | 252—301.4 |
| 3,152,085 | 10/1964 | Ballman et al. | 252—301.4 |
| 3,250,722 | 5/1966 | Borchardt | 252—301.4 |

TOBIAS E. LEVOW, *Primary Examiner.*

ROBERT D. EDMONDS, *Examiner.*